United States Patent [19]

Harold

[11] 4,106,805

[45] Aug. 15, 1978

[54] VEHICLE TRANSPORT TRAILER

[76] Inventor: Billy Harold, 6869 Oldham St., Taylor, Mich. 48180

[21] Appl. No.: 692,060

[22] Filed: Jun. 2, 1976

Related U.S. Application Data

[63] Continuation-in-part of Ser. No. 590,196, Jun. 25, 1975, Pat. No. 3,994,523, which is a continuation of Ser. No. 452,237, Mar. 18, 1974, abandoned.

[51] Int. Cl.² ............................................. B62C 1/00
[52] U.S. Cl. ............................... 296/1 A; 105/368 R
[58] Field of Search ................... 296/1 A; 105/368 R; 280/106 T

[56] References Cited

U.S. PATENT DOCUMENTS

| | | | |
|---|---|---|---|
| 3,084,970 | 4/1963 | Day | 296/1 A |
| 3,104,127 | 9/1963 | Swartzwelder | 296/1 A |
| 3,343,865 | 9/1967 | Stuart | 296/1 A |
| 3,589,767 | 6/1971 | Stuart | 296/1 A |
| 3,690,717 | 9/1972 | Taylor | 296/1 A |

FOREIGN PATENT DOCUMENTS 2,327,489  5/1973  Fed. Rep. of Germany .......... 296/1 A

*Primary Examiner*—Joseph F. Peters, Jr.
*Assistant Examiner*—John A. Carroll
*Attorney, Agent, or Firm*—Harry R. Dumont

[57] ABSTRACT

A vehicle transport trailer including a low bed trailer capable of transporting a load of eight large station wagons and cars, a load of six pick-up trucks, a load of nine small cars, eight mini pick-up trucks, and a broad variety of mixed loads of pick-up trucks, vans, large cars and small cars. The vehicle transport trailer relates to a load of automotive vehicles which are carried entirely within the limits and confines of the self-contained trailer structure without requiring storage of any new vehicle on or above the tractor used to draw the trailer. The several embodiments of the invention are made possible by particular specialized track and track elevating mechanism constructions, and in some cases by a particular orientation of loaded and carried vehicles with a loading sequence related to their relative positions on the trailer.

13 Claims, 19 Drawing Figures

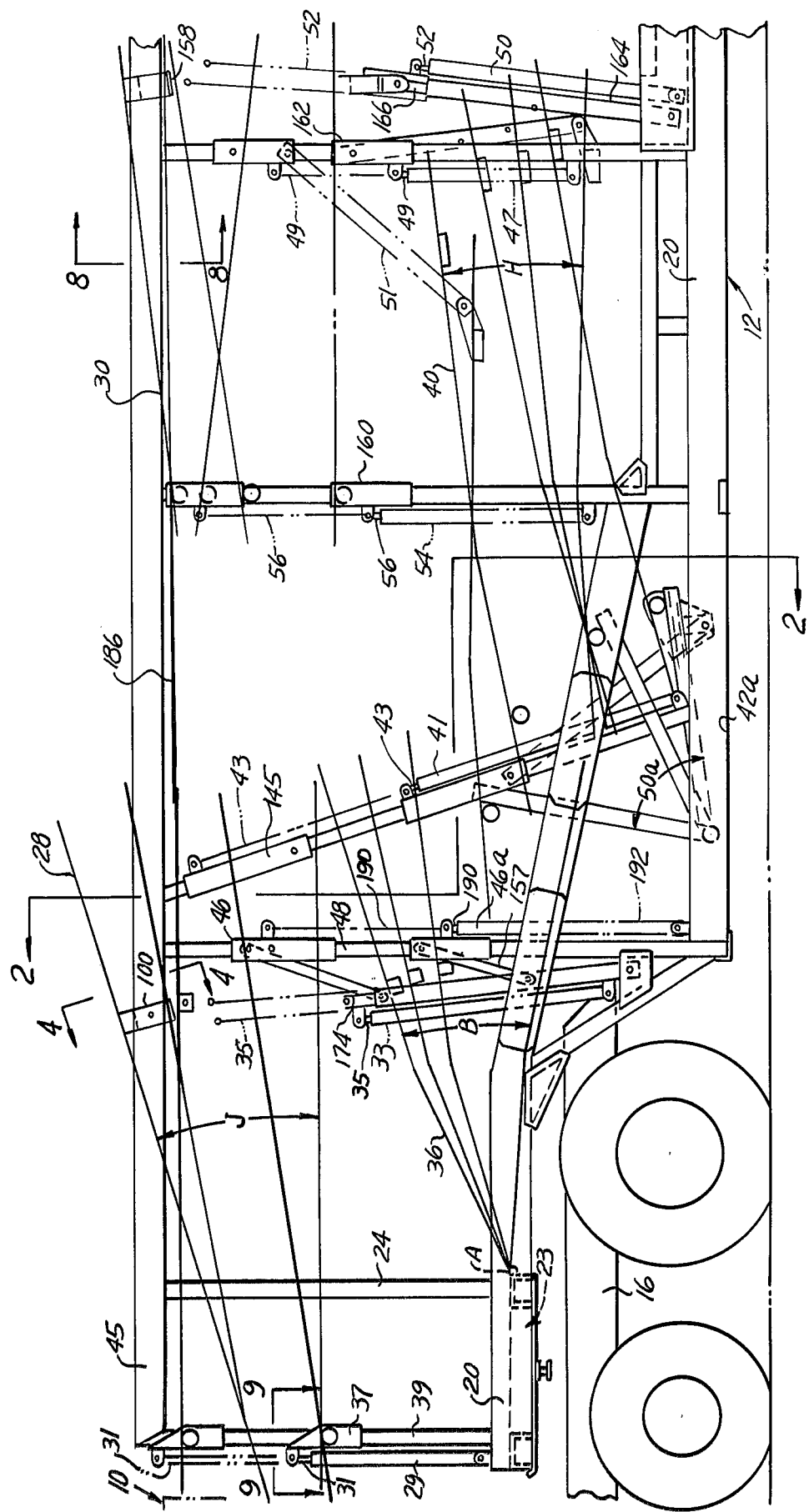

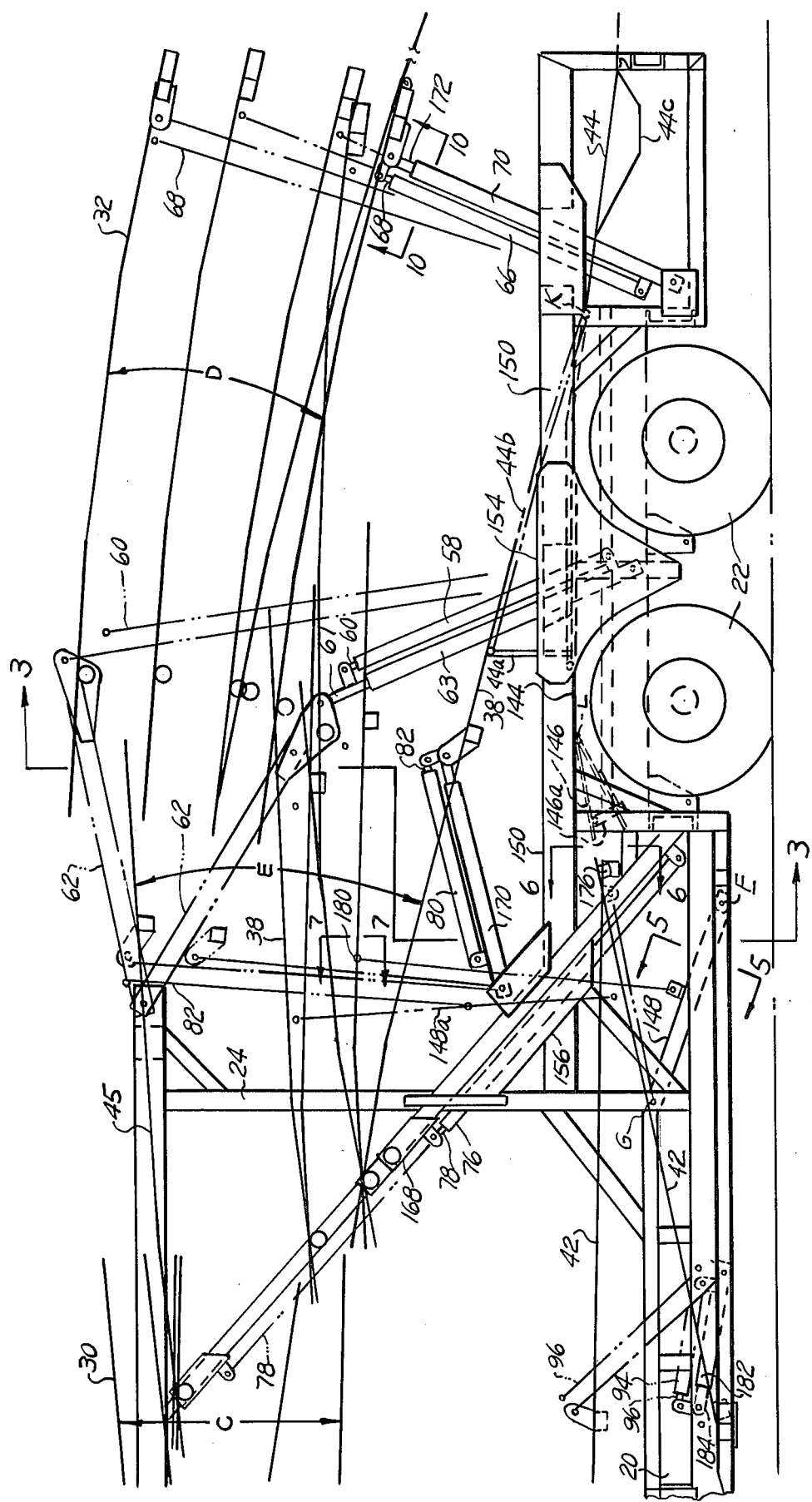
FIG. IB

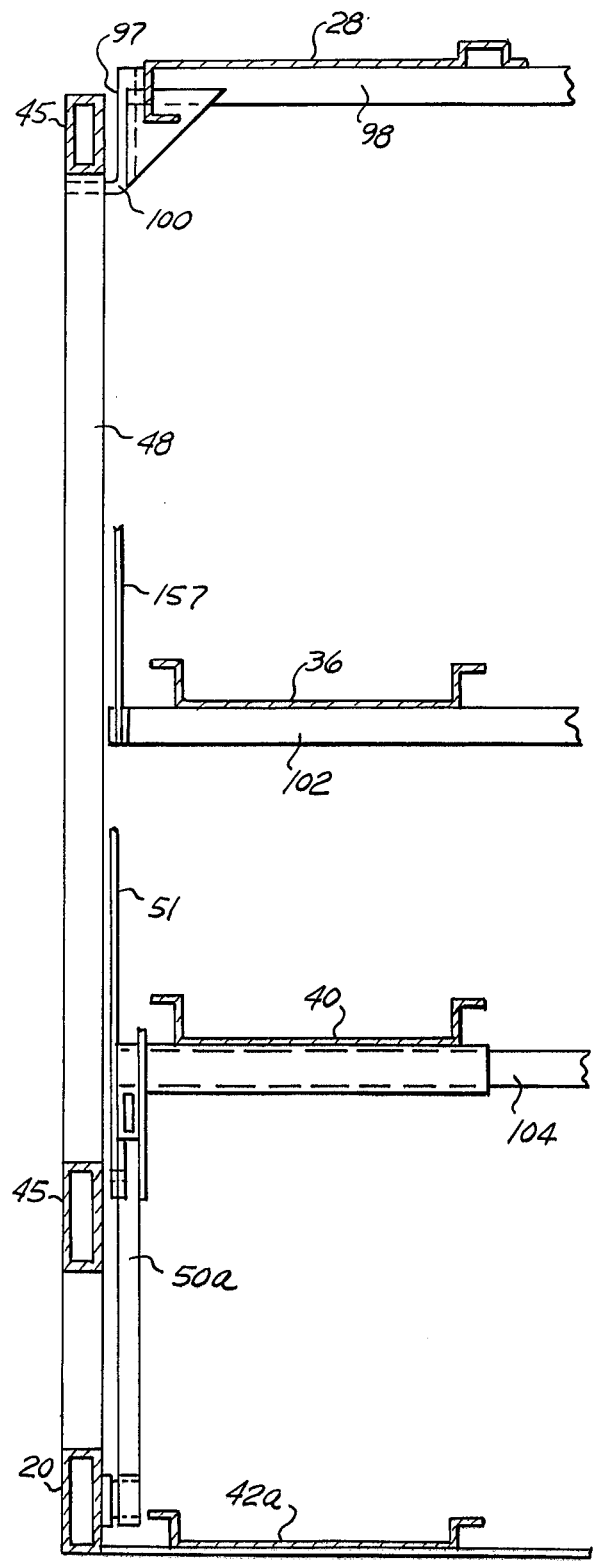
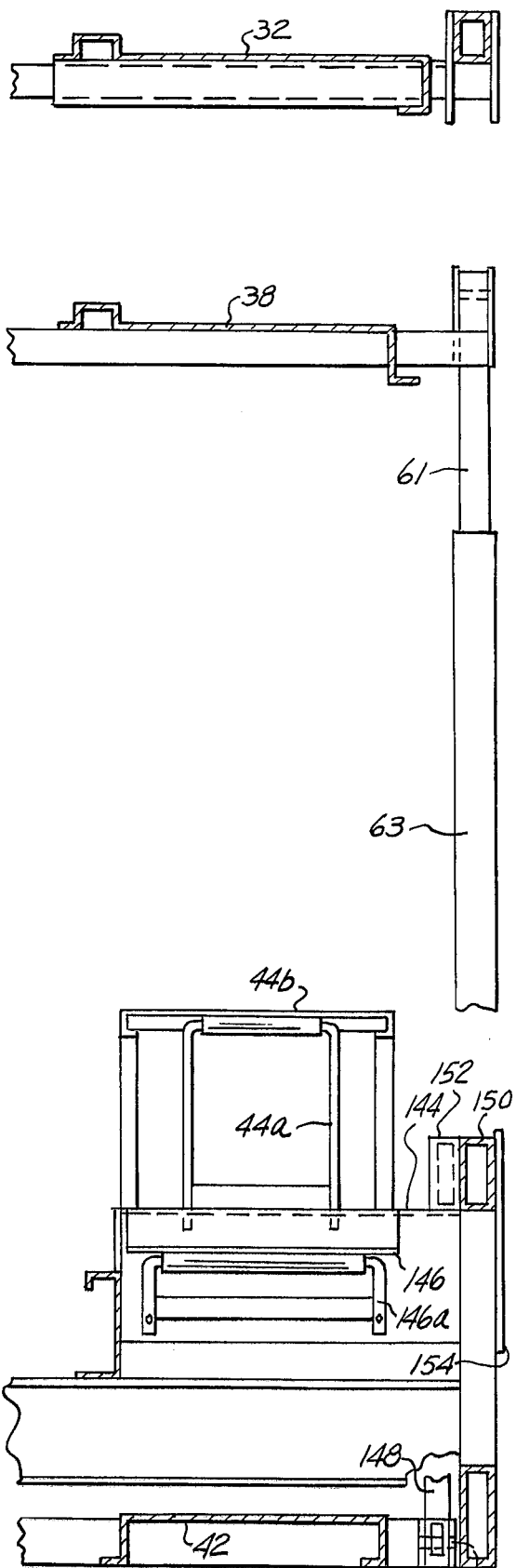
FIG. 2
FIG. 3

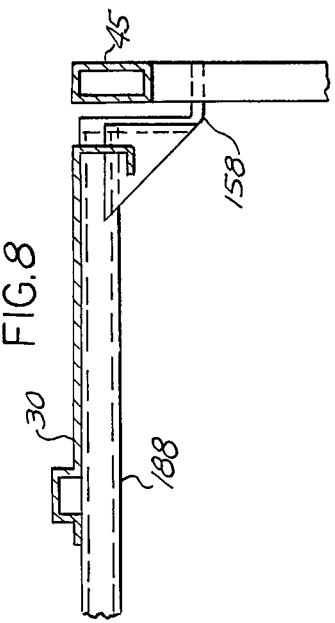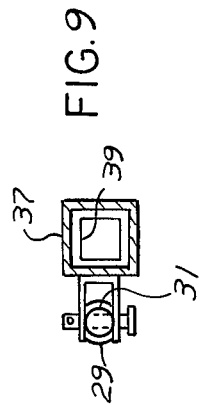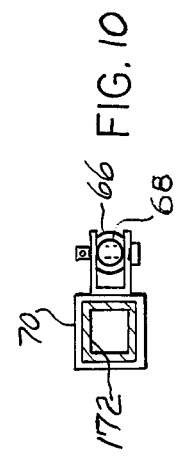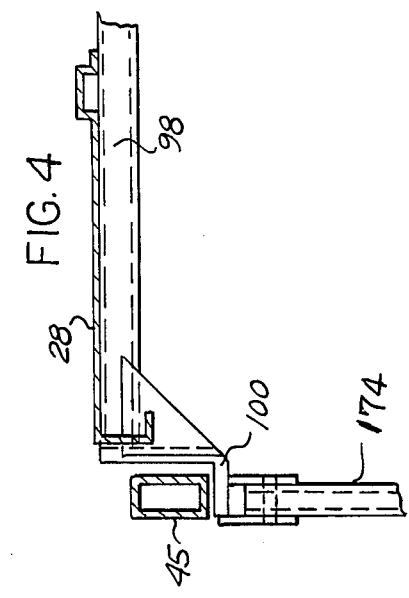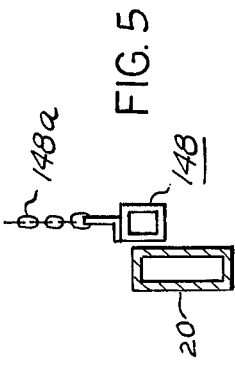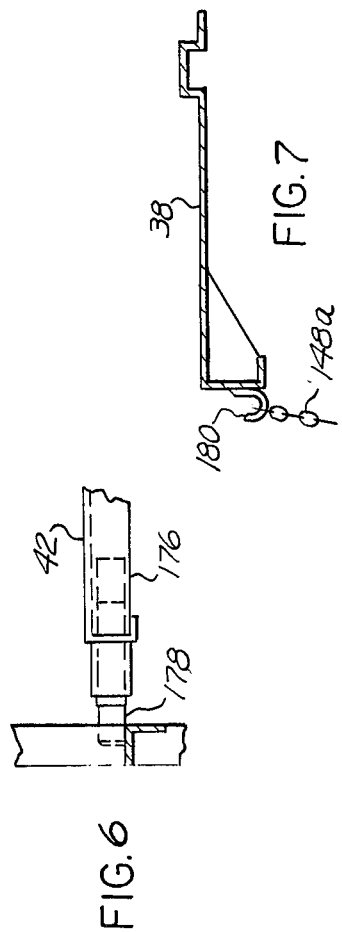

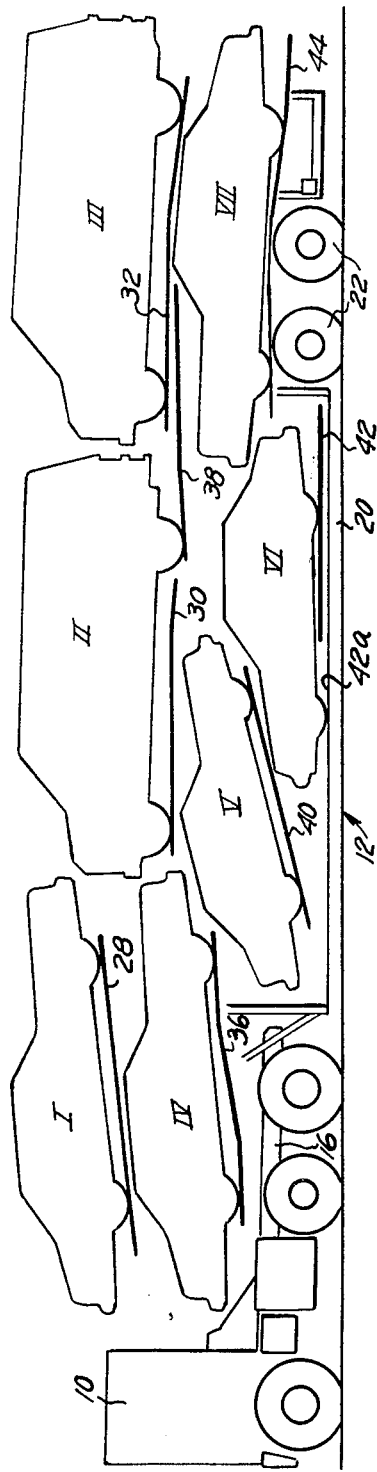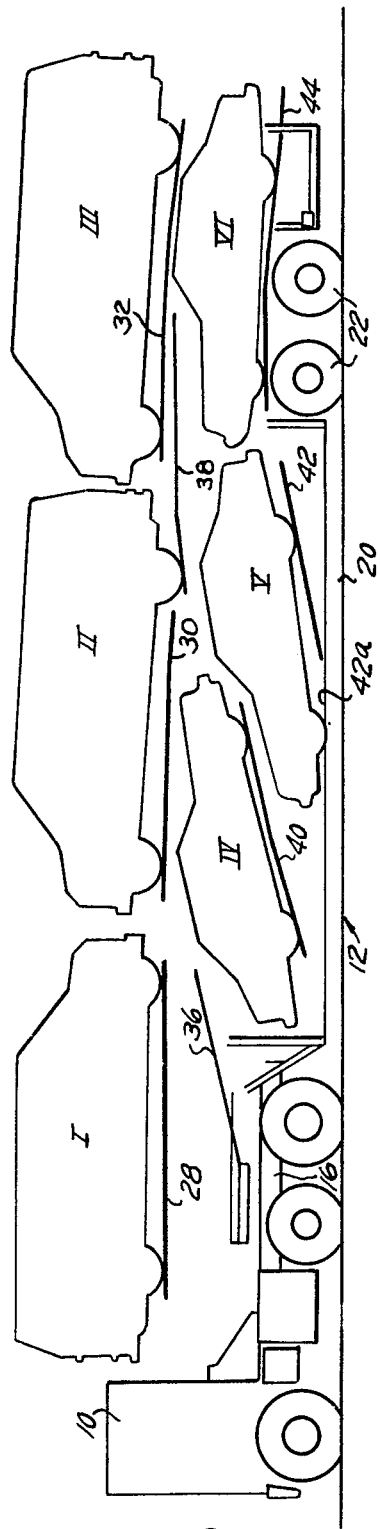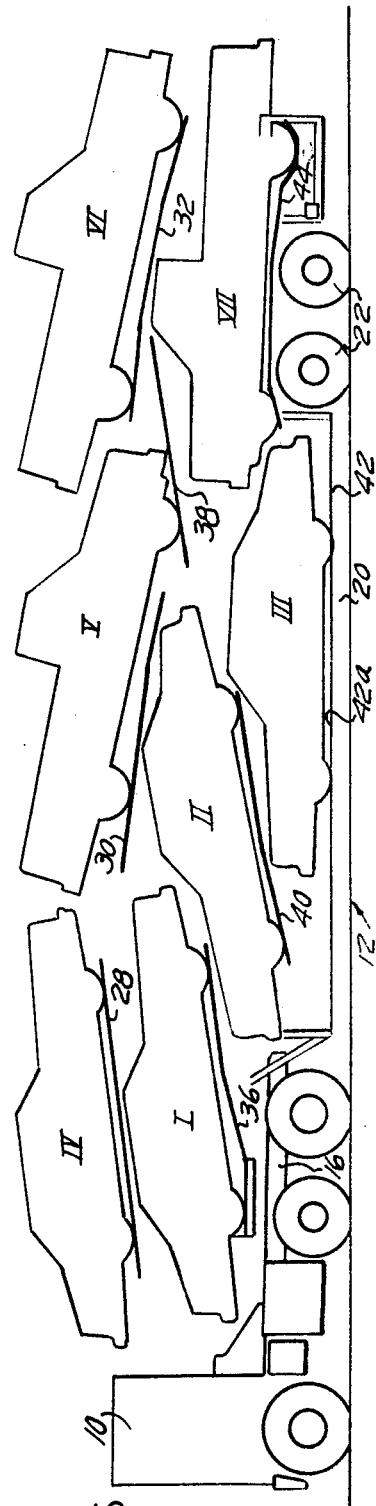

VEHICLE TRANSPORT TRAILER

REFERENCE TO RELATED APPLICATION

This application is a continuation-in-part of my co-pending U.S. application Ser. No. 590,196, filed on Jun. 25, 1975, now issued as U.S Pat. No. 3,994,523 which in turn is a continuation of my U.S. application Ser. No. 452,237 filed on Mar. 18, 1974 for "Vehicle Transport Trailer", now abandoned.

BACKGROUND OF THE INVENTION

This invention relates to a vehicle transport trailer of the self-contained type and more particularly to a tractor-trailer unit capable of hauling a broad variety of vehicle mixes and loadings without the need for carrying or loading an additional vehicle over the tractor cab. The present invention makes it possible to use a relatively large variety of standard commercial tractors to draw the trailer. The entire unit may have a maximum length of, for example, 55 feet with a five foot overhang so as to conform with essentially all of the various state laws which provide maximum length and height limitations for transport vehicles, particularly vehicles used for hauling automotive vehicles. The height limitation further provided in most states is that the maximum height is thirteen and one-half feet.

A major advantage of the present invention, as it will be clarified hereinafter, is that is greatly improves the safety factor with respect to enlarging the driver's field of vision since in the cab he is enabled to see farther in all directions of traffic. There is required no overhead and bracing structure to carry a vehicle over the cab itself in such manner as might obscure the driver's vision.

A still further outstanding advantage of the present invention is the trailer is of the self-contained type so that it is possible to use a standard highway trailer either of the high tilt type or of the conventional lower profile type which can be switched from trailer to trailer independently of the particular vehicle trailer being towed. This allows for a proper matching between the loading of vehicles and the power of the tractor used. This promotes fuel conservation, reduces the number of tractors needed to move a given number of vehicles over the highway, and thus reduces the exhaust emissions which serve to pollute the atmosphere. The present invention thus allows for lower maintenance and operating costs. The trailer can be preloaded at the terminal without tying up tractors during the loading process. When not being used for hauling specialized vehicle hauling trailers, tractors can be used to haul bulk cargo.

The present invention further makes possible easy servicing of the tractor since any type of motor can be installed or exchanged without interference with the vehicle payload. When road breakdowns occur, immediate tractor exchange is possible.

A variety of vehicle transports are in current commercial use, most of which are subject to certain obvious shortcomings and disadvantages. An example of one such vehicle transport is shown and described in Stuart U.S. Pat. No. 3,589,767. The vehicle thereindescribed is typical of many vehicle transports on the road today, in that one of the vehicles being transported must be carried on the forward ramp built over the cab, thus placing an overall limit on the size and power of the truck tractor used to haul the equipment.

A different vehicle transport system is shown and described in Stuart U.S. Pat. No. 3,343,865. This transport has similar problems with respect to requiring the loading and storage of a carried vehicle over the tractor cab and again requires an extension of the forward ramp and costly modification of a standard tractor by incorporating that ramp.

A still further vehicle transport is shown and described in Taylor U.S. Pat. No. 3,690,717, which in a manner similar to the first mentioned patent requires storage of a transported vehicle over a custom modified tractor.

SUMMARY OF THE PRESENT INVENTION

The present invention relates to a transport tailer which is adaptable to be towed by any of a number of standard type tractors. The vehicle transport trailer may be characterized as having three tracks aligned longitudinally along the top of the trailer which are adjustable vertically at either or both ends. It further includes two intermediate tracks and three lower tracks, two fixed and one movable. The track arrangement allows loading with a maximum number of vehicles in the backed-on position. This feature is of advantage since unloading is frequently done at night and the unloading process is facilitated when the vehicle can be driven off from such a position that the headlights may be used.

The present invention further provides an advantage in that the intermediate set of two tracks are spaced longitudinally along the trailer length and movable between lower and upper positions. The combination of the above mentioned upper and intermediate tracks along with the lower fixed tracks and the movable track in the bed of the trailer allows for a great variety of mixed vehicle loadings.

BRIEF DESCRIPTION OF THE DRAWINGS

A complete explanation of the present invention will be provided with reference to the accompanying specification and to the several drawings in which like parts are identified with like numerals where they appear in the several views, and wherein:

FIG. 1A is a side elevational view of the forward half of a vehicle transport trailer incorporating the present invention;

FIG. 1B is a side elevational view of the rearward half of the trailer of FIG. 1A;

FIG. 2 is a vertical sectional view along the section line 2—2 of FIG. 1B;

FIG. 3 is a vertical sectional view along the section line 3—3 of FIG. 1B;

FIG. 4 is a fragmentary sectional view taken along the section line 4—4 of FIG. 1A;

FIG. 5 is a sectional view broken away in part and taken along the section line 5—5 of FIG. 1B;

FIG. 6 is a sectional view with parts broken away and taken along the line 6—6 of FIG. 1B;

FIG. 7 is a partial sectional view taken along the line 7—7 of FIG. 1B;

FIG. 8 is a partial sectional view taken along the section line 8—8 of FIG. 1A;

FIG. 9 is a sectional view taken in FIG. 1A as indicated;

FIG. 10 is a sectional view taken in FIG. 1B as shown;

FIG. 11 through 18 are side elevational views of a partially schematic type illustrating a number of loading and mixed loadings of both commercial and passenger vehicles in which;

FIG. 11 shows a load of nine small cars;

FIG. 12 shows a mixed load of three large station wagons and five large cars;

FIG. 13 shows a mixed load of six large cars and one van;

FIG. 14 shows a mixed load of three vans and three small cars;

FIG. 15 shows a mixed load of three vans and three small cars;

FIG. 16 shows a mixed load of four large cars and three pick-up trucks;

FIG. 17 shows a load of six pick-up trucks;

FIG. 18 shows a load of eight mini pick-up trucks;

DETAILED DESCRIPTION

Figure 11:
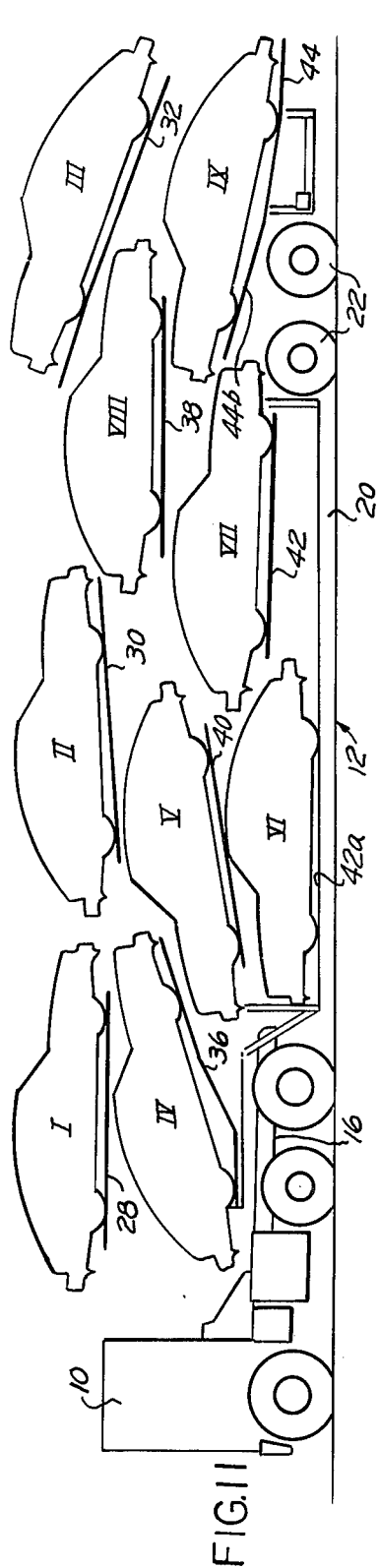

The vehicle transport of the present invention is shown in its entirety together with the tractor 10 in FIGS. 1A, 1B and 8-18. It comprises a conventional tractor 10 of the tilt cab type and a trailer 12. The tractor 10 has a main frame 16 on which there is supported the forward end of the trailer 12. It will be understood that the trailer 12 is adapted to be hauled by any type of standard commercial tractor, either of the high or the low cab type. The trailer 12 further has a main frame 20 of the low bed or drop center type, the front of which is supported on the tractor 10 through drop center type, the front of which is supported on the tractor 10 through a conventional king pin hookup mechanism 23 and the rear of which is supported by wheels 22. The trailer frame 20 supports a superstructure which includes a number of relatively spaced and like vertical side members 24, each being fabricated from rigid structural members and connected in a common vertical frame to form a truss-like load supporting structure of a substantial vertical height and strength. The spaced side members 24 are interconnected at the bottom to the main frame 20 of the trailer 12. The tailer 12 includes a number of different and separately actuated tracks, certain of which are movable in a predetermined sequence and manner as will be described hereinafter to provide a versatility of loading and of vehicle mix not possible with known vehicle transport systems. The several movable tracks are generally shown in their lowermost position, in one or more intermediate positions, and in their uppermost position in solid line form. The upper three tracks are denoted by the numerals 28, 30 and 32. The two intermediate level tracks are denoted by the numerals 36 and 38. It will be understood that there are also included a series of three lower tracks 40, 42 and 44. The first lower track 40 is mounted and pivotably movable at both ends. The second lower track 42 is positioned in the bed of the trailer 12 and includes a rearward movable track portion 42. The third track 44 is stationary. It includes a wheel pocket 44C at its rear end and a pivotal track portion 44B at its front end.

In each of the schematic drawings illustrating the different exemplary mixed vehicle loadings, that is in FIGS. 11 through 18, the vehicles carry a Roman numeral designation which shows the sequence in which they are loaded on the trailer 12. This sequence is, of course, sometimes critical with respect to the handling of the several tracks involved, particularly with respect to their being elevated and lowered between the loading and carrying positions. Detailed descriptions will be given hereinafter for the representative loadings shown in FIGS. 11-18.

The movement of the three upper tracks 28, 30 and 32 is generally vertical and is accomplished in each case through an associated hydraulic or pneumatic elevating mechanism as best shown in FIGS. 1A and 1B. This mechanism includes with respect to track 28 a forward cylinder 29 and a piston rod 31. The rod 31 is attached to a pair of telescoping tubes 37, 39 as shown in FIG. 9. A second cylinder 33 and piston rod 35 are connected to the rearward end of the track 28 with an associated telescoping tube 174 and with the two side track portions laterally supported and connected by cross members in a manner which will be better shown in FIG. 4 hereinafter. Responsive to the operation of the two above mentioned cylinder and piston rod combinations, the track 28 will be moved slidably and pivotably upward. This upward movement will provide a motion of a sleeve 37 which is slidably mounted and journaled on a vertical post 39, forming a part of the superstructure of the trailer 12. Each such vertical post is fixed at its upper end to a frame member 45 and its lower end to the base 20 of the trailer 12.

It will be understood that during the loading process it is necessary in some cases to temporarily position skids in order to bridge spaces left intermediate the several different tracks or between the rearward end of the track 32 and 44 and ground so that the vehicles may be loaded. One example of such a loading skid is identified by the numeral 186. Skid 186 is shown in position bridging tracks 28 and 30.

It will be seen that the forwardmost intermediate track 36 is pivotally movable through the arc designated by the letter B between lower and upper positions through the operation of an associated hydraulic mechanism including cylinder 46a piston rod 190 and a sleeve 46 that is vertically movable on an upstanding post 48. The movement of the track 36 is thus generally pivotable about its forward mounting at a pivot point A.

The second upper track 30 is shown between its lower and upper positions with the path of arcuate movement being designated by the letter C. The movement of the front of the track 30 is controlled through the operation of a cylinder 54, associated piston rod 56 piston and sleeve 160. The movement of the rear of the track 30 is controlled by a cylinder 50, rod 52 and telescoping sleeves 164 and 166.

The third upper track 32 is movable generally in the arcuate path designated by the letter D and is controlled in it movement at its forward end through the operation of a cylinder 58 and a piston rod 60 and through a pivotal link 62 mounted at its forward end on the frame member 45. The movement of the track 32 at its rearward end is controlled through a further cylinder 66 and rod 68 and through the upward and downward movement of a telescoping sleeve 70 and tube 172.

The rearward intermediate track 38 is movable between the extreme positions shown through an arcuate path travel identified by the arrow E. The movement of the track 38 at its forward end is provided through the operation of a cylinder 76, rod 78, and slider 168. The movement of the track 38 at its rearward end is controlled by the operation of a cylinder 80, rod 82 and associated sleeve 170.

The forwardmost lower track 40 is elevated at its front end by the action of cylinder 41, rod 43, a sleeve 145 and associated linkage 50a. The track 40 is movable at its rearward end by the action of a cylinder 47, a rod 49, and associated link 51 and slider 162. The general path of movement of the track 40 is shown by the letter H.

The next lower track 42a is mainly positioned flat in a stationary position in the bed of the trailer 12. A rearward movable track portion 42 is movable at its forward end through the control of a cylinder 94, rod 96, associated telescoping tube 184 and sleeve 182. The link 148 controls the movement of the other end of the track portion 42 by the lifting movement given by a chain 148a which in turn is connected to the track 38 in a manner better shown in FIGS. 5 and 7 hereinafter. Thus the rear portion 42 of the track 42a may be flat in lower postion as shown in FIG. 15 on flat in the raised position as shown in FIG. 11.

Figures 17, 18:
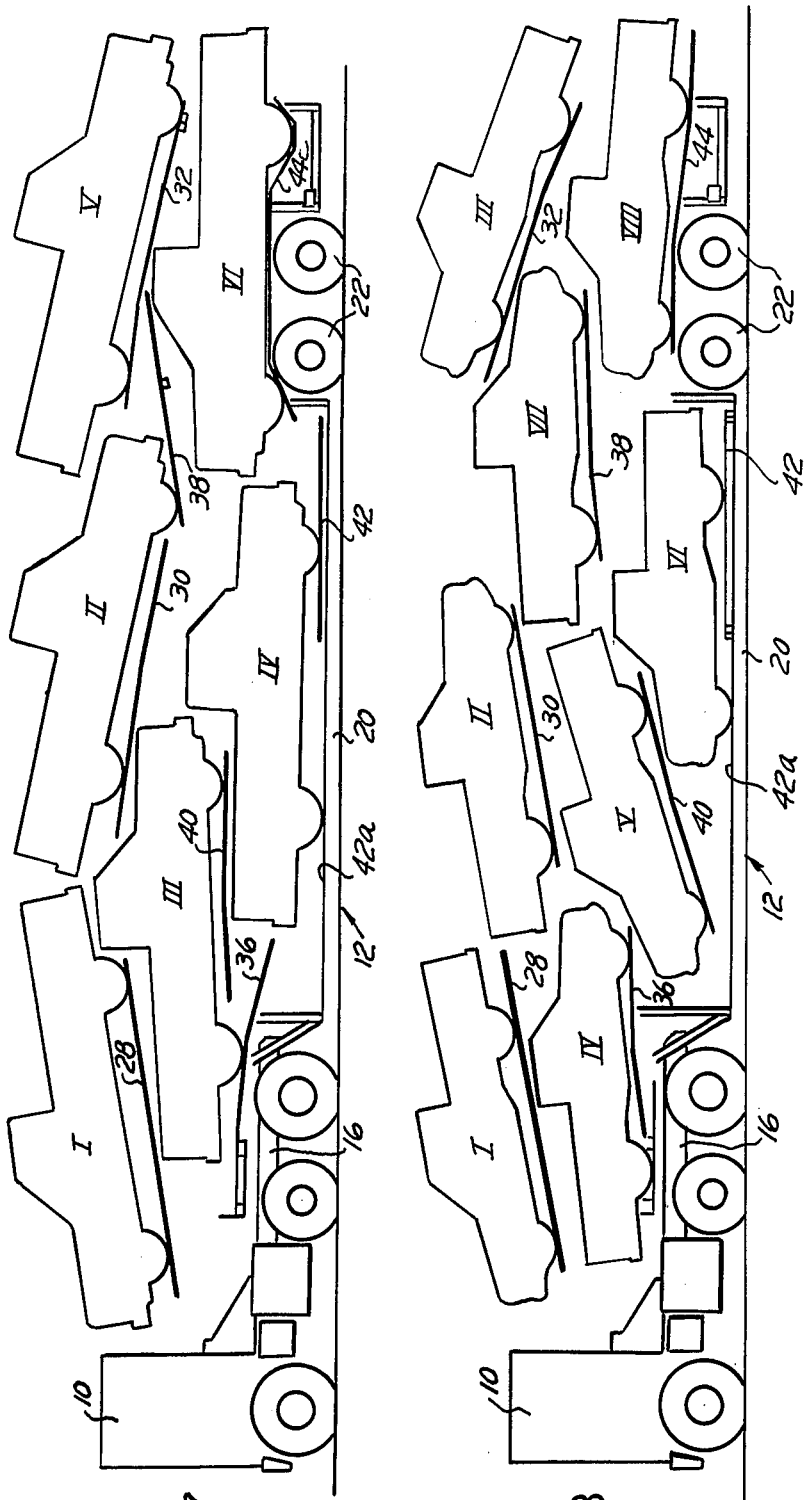

The third lower track 44 is mounted at the end of the trailer 12. The track 44 includes a wheel pocket 44c positioned at its rear end which is used in certain of the loadings such as shown in FIGS. 16 and 17. The track 44 also includes a pivoted track portion 44b at its front end. The detail of track portion 44b and its associated mechanism is shown in FIG. 3 hereinafter.

FIG. 2 clarifies the relative locations of tracks 28, 36 40 and 42a and the manner in which they are mounted. It will be seen that the track 28 includes two spaced sections connected by a cross brace 98. An angle plate 97 is mounted at each end of the track 28 and includes a bend portion 100. Tracks 36 and 40 in a like manner include spaced sections which are mounted on cross bars 102 and 104, respectively. Tracks 36 and 40 further have connected to them struts 157 and 51, respectively. The tracks thus are all mounted inside the trailer superstructure which includes vertical members 48 and horizontal members 45.

FIG. 3 shows further detail for tracks 32, 38 and 44. The pivotal track portion 44b has mounted at its forward end a stand 44a for supporting it in a raised position. Also shown is a forward pivot plate 146 and associated stand 146a which is used when required to bridge the space between track 42 and the wheel housing 144. The horizontal tube 150 is formed in two sections. An inside tube 152 is mounted between the separated sections of tube 150. An outside plate 154 is used to box in the telescoping tube 63 and cylinder 58 as already illustrated in FIG. 1B. Also shown is the pivot link 148 and its attachment at pivot point F.

FIG. 4 shown the mounting for upper track 28 and the manner in which bend portion 100 abuts with and is operated by the slider 174.

FIG. 5 and 7 are used to clarify the connection of the chain 148a between link 148 and a chain hook 180 on track 38 such that the lower pivotal track portion 42 can be lifted to its upper position along with the track 38.

FIG. 6 shown a cross member 176 for the track 42 and a slidable tube 178 mounted therein to selectively lock in track 42 in a raised position.

FIG. 8 shows the cross member 188 for the track 30 and bend portion 158 associated with that track.

FIG. 9 is used to show the cooperative relationship between cylinder 29, rod 31, inner tube 39 and outer tube 37.

FIG. 10 in a like manner shows the construction of cylinder 66, rod 68 inner tube 172 and outer tube 70.

DESCRIPTION OF MIXED VEHICLE LOADINGS

Reference is now made to the FIG. 11 drawing and a description will be given for the loading pattern by which nine small cars may be loaded on the trailer 12. In advance it is necessary that the terminology used with respect to the various types of vehicles be clarified, and accordingly the following is a listing of representative vehicles with their appropriate height and length in inches for each different type vehicle. This classification according to length and height is by way of example only and not to be considered limiting with respect to the invention:

|  | HEIGHT (Inches) | LENGTH (Inches) |
| --- | --- | --- |
| PICK-UP TRUCK | 72 | 217 |
| LARGE CAR | 57 | 181–216.7 |
| LARGE STATION WAGON | 58 | 181–218 |
| SMALL CAR | 55 | 180 |
| MINI PICK-UP TRUCK | 62 | 176 |
| VAN | 83 | 208 |

When the various terms, such as pick-up truck, large car, small car and the like are hereinafter used, it will be understood that they relate to vehicles having the general size ranges above indicated. In each case, where a particular loading is shown and described it will be understood that a like arrangement may be made of vehicles of lesser but included height and length dimension than shown in the table above.

Now again with more particular reference to FIG. 11, the sequence in which the several vehicles are loaded is indicated by Roman numerals on each. Initially the upper tracks 28, 30 and 32 are lowered so they are substantially in line. A loading skid, not shown, is placed between the rear end of the track 32 and ground level. The skid 186 is set between tracks, 28 and 30, Track 38 is raised to span between tracks 30 and 32. Vehicles I, II, III are then sequentially driven into place with the orientation as shown. Next skid 186 is removed and tracks 28, 30, 32 and 38 are over lifted to allow for loading the next vehicles IV and V. Tracks, 36, 40 and 42 and 44 are aligned and a jumper skid placed between the rear end of track 44 and ground level. Vehicles IV is backed into position and the rear end of the track 36 is elevated. Car V is driven on track 40 and its rear end is elevated. Vehicle VI is driven on track 40. Vehicle VII is backed on track portion 42 after its front is raised. Track 38 is slantingly aligned with the pivotal track portion 44b to permit vehicle VIII to be backed into place. The rear end of the track 38 is then tilted upwardly to allow the final loading of the vehicle IX. All tracks are then lowered to allow the necessary overhead clearance.

Figure 12:

FIG. 12 illustrates a mixed loading of large cars and large station wagons. Again the sequence of loading is indicated by Roman numerals on each vehicle. Skid 186 is placed between tracks 28 and 30. The upper three tracks 28, 30 and 32 are lowered and aligned with a loading skid, not shown, placed between the rear end of the track 32 and ground level. Track 38 is adjusted to span between track 30 and 32. Vehicles I, II and III are then driven or backed into position on their respective tracks. The track 38 is in its elevated position and the lower tracks 40, 42 and 44 are horizontally aligned to permit the backing on of vehicle IV. Track 36 is tilted up and vehicle V is driven unto track 40. The rear end of the track 40 is then tilted up to allow the driving on of vehicle VI. The track 42 is lowered to a flat lowered position in the trailer and vehicle VI is thus placed into carrying position. The track 38 is then tilted rearwardly to place it in line with the raised pivotal track portion 44b so that vehicle VII can be backed on. The track 38 is then raised to a level position, the pivotal track portion 44b is lowered and vehicle VIII is driven on to the track 44. The loading skid is removed and the loading is completed.

Figure 13:
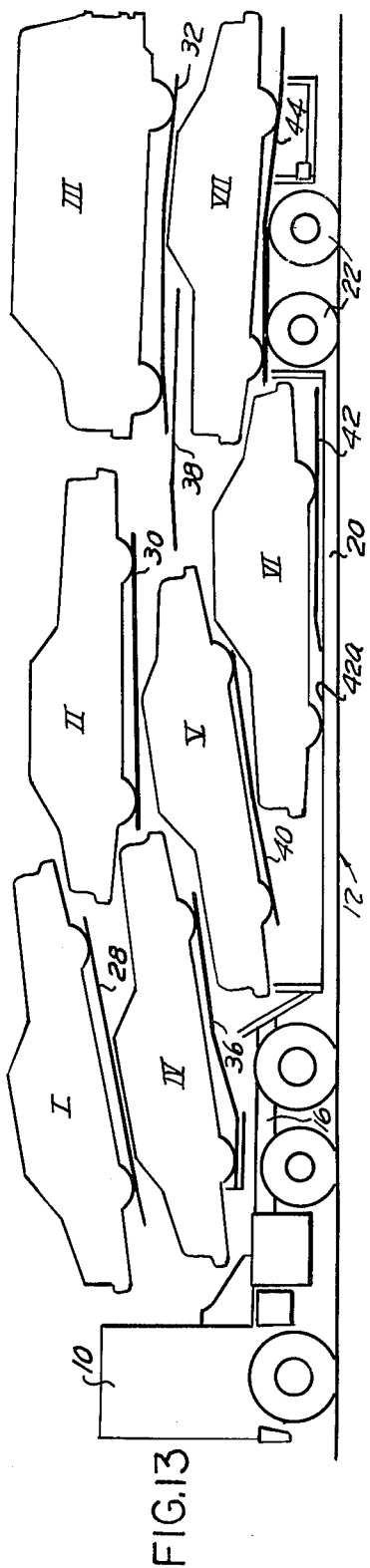

In the loading illustrated in FIG. 13, the same procedure as described above is followed for vehicles I, II, III, IV, V and VI. However, the track 38 is left in an elevated and inactive position while the last vehicle VII is driven on. The loading skids are removed and the upper tracks 28, 30 and 32 are lowered to their carrying position.

In the FIG. 14 loading the procedure is generally similar to that described for FIG. 13 However, the intermediate track 38 is aligned along with the three upper tracks 28, 30 and 32 both for loading and for carrying. It will be seen that the track 38 bridges the space between tracks 30 and 32 and supports the rear wheels of the van II in a carrying position.

The FIG. 16 loading sequence differs from the earlier discussed loading in that the intermediate track 36 and lower tracks 40 and 42a are first loaded. The upper three tracks 28, 30 and 32 are then loaded, again with the center upper vehicle V bridging tracks 30 and 38. Finally, the last vehicle VII is loaded with its rear wheels set not on the track 44 but in the wheel well 44c to lower it the required distance.

FIG. 17 shows a loading of six pick-up trucks in which vehicles I and II ar first loaded on the upper tracks 28 and bridging tracks 30 and 38, respectively. The vehicle III is carried in a bridging position with respect to tracks 36 and 40. Track 40 is overlifted to allow vehicle IV to be backed in after vehicle III is loaded, the track 38 is lowered so that vehicle V can be backed in track 32. The rear of track 38 is then raised and track 32 raised to allow vehicle VI to be driven in. Skids are removed and all tracks are height adjusted into carrying position. Again in a manner similar to FIG. 16, the last loaded vehicle VI has its rear wheels supported in the wheel well 44c.

FIG. 18 illustrates a loading of eight mini pick-ups in which the three upper tracks 28, 30 and 32 are first loaded, the front intermediate track 36 and the first two lower tracks 40 and 42 are then loaded, and the rearward intermediate track 38 and last lower track 44 are finally loaded.

It will thus be seen that I have provided by my invention a new and improved vehicle transport system which is characterized by its versatility and capability of handling a broad mix of standard vehicles, both passenger and commercial, which is not possible with prior art transport trailers.

What is claimed is:

1. A vehicle transport trailer for carrying a plurality of vehicles comprising:
   three upper elevatable tracks operable to be height adjusted in a loaded condition, a first upper track having its front end proximate a forward end of said trailer;
   a pair of intermediate tracks adjustable for height, a first of said intermediate tracks substantially aligned below the first of said upper tracks and a second of said intermediate tracks spanning a rear and front respective end of the two rearwardmost upper tracks;
   three lower tracks mounted in a bed of said trailer; the rearwardmost two of said lower tracks substantially stationary in said bed and a forwardmost of said lower tracks being vertically movable; and
   lifting means operably connected to the forwardmost of said lower tracks for lifting and expanding it forwardly between a loading and a loaded position.

2. The combination as set forth in claim 1 wherein said lifting means for said tracks includes at least one fluid operated cylinder and rod assembly having its axis lying in a substantially vertical direction.

3. The combination as set forth in claim 1 wherein the middle one of said lower tracks includes a stationary forward portion and a pivotable rearward portion.

4. The combination as set forth in claim 3 wherein a chain lifting means is connectable between said rearward intermediate track and said pivotable rearward portion of said middle lower track for elevating such portion.

5. The combination as set forth in claim 1 wherein the forwardmost two of said upper tracks, the forwardmost and the rearwardmost of said intermediate tracks, and the middle one of said lower tracks are each operable to support a small car in a rearward facing carrying position; and wherein the four remaining ones of said tracks are each operable to support a small car in a forward facing carrying position.

6. The combination as set forth in claim 1 wherein the forwardmost two of said upper tracks and said intermediate tracks are each operable to support a rearward facing large vehicle in a carrying position and wherein the lower tracks are each operable to support a forward facing large vehicle in a carrying position.

7. The combination as set forth in claim 6 wherein the forwardmost and rearwardmost of said upper tracks and the rearwardmost of said lower tracks are each operable to support a large station wagon in such position and wherein the remainder of said tracks are each operable to support a large car in such position.

8. The combination as set forth in claim 1 wherein the rearwardmost of said upper tracks is operable to support a forward facing van in a carrying position; the forwardmost two upper tracks and the forwardmost intermediate track are each operable to support a rearward facing large car in a carrying position; and said three lower tracks are each operable to support a forward facing large car in a carrying position.

9. The combination as set forth in claim 1 wherein the rearwardmost two of said upper tracks are each operable to support a forward facing van in a carrying position; the forwardmost upper track and forwardmost intermediate track are each operable to support a rearward facing large car in a carrying position; the rearwardmost one of the lower tracks is operable to support a forward facing large car in a carrying position; the middle of the lower tracks is operable to support a forward facing small car in a carrying position; and the forwardmost of the lower tracks is operable to support a rearward facing small car in a carrying position.

10. The combination as set forth in claim 1 wherein the rearwardmost of said upper tracks is operable to support a rearward facing pick-up truck; the middle upper and rearmost intermediate tracks are jointly operable to support a rearward facing pick-up truck in a carrying position; the forwardmost upper track and the forwardmost intermediate track are each operable to support a rearward facing large car in a carrying position; and the forwardmost two of the lower tracks are each operable to support a forward facing large car in a carrying position.

11. The combination as set forth in claim 1 wherein the middle upper track and the two intermediate tracks are each operable to support a rearward facing mini pick-up truck in a carrying position and wherein each of the remaining tracks is operable to support a forward facing mini pick-up truck in a carrying position.

12. The combination as set forth in claim 1 wherein said rearwardmost of said lower tracks includes a pivotal forward portion and a stand connected to said track for supporting it in a raised position.

13. The combination as set forth in claim 1 wherein said rearwardmost lower track is movable to a storage position and has positioned below it a wheel well pocket for retaining the wheels of a loaded vehicle in such position.

* * * * *